Feb. 2, 1926.
S. G DOWN
BRAKE SHOE CONSTRUCTION
Filed Nov. 1, 1923
1,571,242
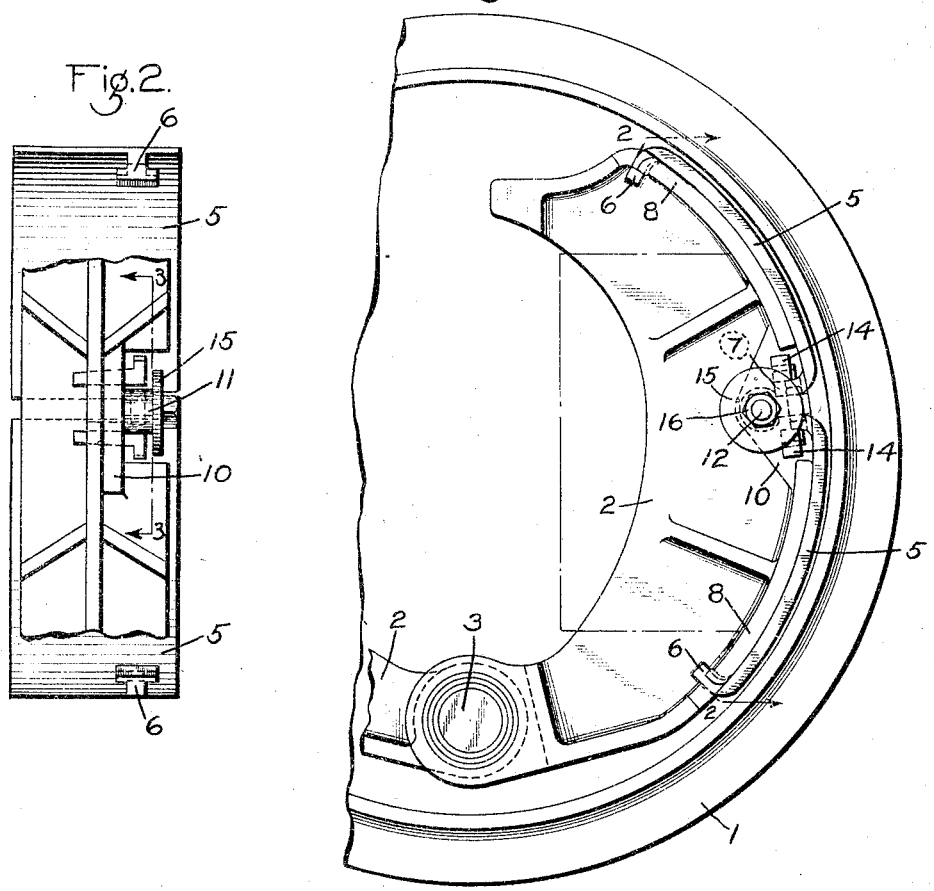
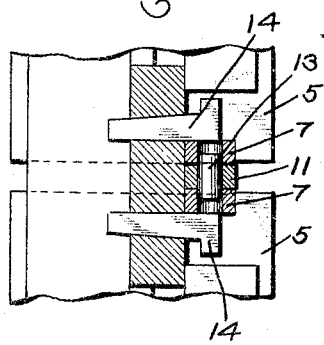
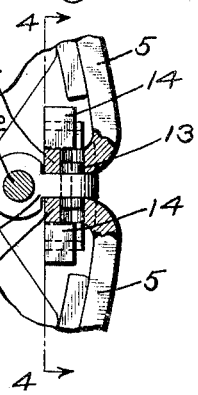
INVENTOR
SIDNEY G. DOWN
BY Wm. M. Cady
ATTORNEY Patented Feb. 2, 1926.

1,571,242

UNITED STATES PATENT OFFICE.

SIDNEY G. DOWN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE CONSTRUCTION.

Application filed November 1, 1923. Serial No. 672,118.

*To all whom it may concern:*

Be it known that I, SIDNEY G. DOWN, a citizen of the United States, residing at Pittsburgh, in the county of Allegheny and State of Pennsylvania, have invented new and useful Improvements in Brake-Shoe Constructions, of which the following is a specification.

This invention relates to brake shoes, and more particularly to a brake shoe construction for the internal expanding drum type of brake as employed on automotive vehicles.

The principal object of my invention is to provide an improved brake shoe construction of the above character.

In the accompanying drawing; Fig. 1 is an elevation of an internal expanding brake construction, showing my improved brake shoe construction applied thereto; Fig. 2 a section on the line 2—2 of Fig. 1; Fig. 3 a section on the line 3—3 of Fig. 2; and Fig. 4 a section on the line 4—4 of Fig. 3.

As shown in Fig. 1, a brake drum 1 is provided within which are mounted brake heads 2 connected together by a pivot pin 3 and each having an arcuate face for receiving a brake shoe adapted to engage the internal friction face 4 of the brake drum 1.

According to my invention two brake shoes are employed on each brake head and each brake shoe 5 may be formed to engage the arcuate face of the brake head 1. One end of each brake shoe is cut away so as to leave a T shaped tongue 6 at one side, which is bent radially inward. The other end of the brake shoe is cut away to leave a lug 7 which is bent radially inward. The brake head 1 has the flange 8 apertured at opposite ends of the arcuate face and at one side of the web 9, the aperture being T shaped, with the broad portion of the T outward.

Centrally of the arcuate face and at one side of the web 9, the flange 8 is cut away and a thickened portion 10 is provided on the web 9 at the cut away region of the flange 8. A locking member 11 is provided which is secured in position by means of a bolt 12 extending transversely through an aperture in the thickened portion 10. Secured in the member 11 at right angles to the axis of bolt 12 is a pin 13 which projects out at opposite sides of said member, as clearly shown in Fig. 3, and adjacent the pin 13, the thickened portion 10 is provided with transversely tapered springs to receive tapered keys 14 at opposite ends of the member 11. The member 11 being secured in position by bolt 12, each brake shoe 5 is applied by first inserting the T shaped lug 6 through the T shaped opening in the flange 8. The lug 7 at the other end of each brake shoe is apertured to receive the pin 13, so that after the T lug has been inserted in the corresponding T slot in flange 8, the brake shoe may be moved longitudinally along the arcuate face of the brake head until the aperture in the lug 7 engages over the projecting end of pin 13.

The wedges 14 are then inserted in the corresponding openings in the portion 10 at each side of the lugs 7, so that the lugs 7 of each brake shoe are secured in position, with the member 11 interposed between the adjacent lugs 7 of the two brake shoes.

A washer 15 is applied to the bolt 12 and a nut 16 is then applied to the bolt and screwed down, so that the washer 15 engages the adjacent edges of the lugs 7, to prevent transverse movement of the shoes.

By means of the above construction the two brake shoes are secured in position by a single centrally arranged fastening means, the outer ends of the brake shoe being held in position on the brake head by engagement of the T lug of the shoe in the T shaped slot in the flange 8.

Having now described my invention, what I claim as new and desire to secure by Letters Patent, is:—

1. The combination with a brake head having an arcuate face for receiving a brake shoe and provided with a T slot at opposite ends, of brake shoes formed to engage said face and each provided with an inwardly turned T shaped end engaging a T slot in the head, and means for securing the other end of each brake shoe to the brake head.

2. The combination with a brake head having an arcuate face for receiving a brake shoe, of a pair of brake shoes formed to engage said face and each having one end detachably engaging said brake head, a pin associated with said brake head for engaging an aperture in each of the opposite ends of the brake shoes, and wedging means for clamping the pin engaging ends of the brake shoes to the brake head.

3. The combination with a brake head having an arcuate face for receiving a brake shoe, of a pair of brake shoes formed to engage said face and each having one end detachably engaging said brake head, a pin associated with said brake head for engaging an aperture in each of the other ends of the brake shoes, and a wedge for clamping each pin engaging end of the brake shoes to the brake head.

4. The combination with a brake head having an arcuate face for receiving a brake shoe and having an opening at each opposite end of the arcuate face, of a pair of brake shoes formed to engage said face and each having a bent portion at one end adapted to engage in one of said openings and a wedge for clamping each of the other ends of said brake shoes to the brake head.

In testimony whereof I have hereunto set my hand.

SIDNEY G. DOWN.